T. Clark,
Turning Irregular Forms.
N°4,932.　　　　Patented Jan. 19, 1847.

2 Sheets—Sheet 2.

UNITED STATES PATENT OFFICE.

TIMOTHY CLARK, OF NEW HAVEN, CONNECTICUT.

MACHINE FOR TURNING IRREGULAR SHAPES.

Specification forming part of Letters Patent No. 4,932, dated January 19, 1847; Reissued November 12, 1950, No. 182.

*To all whom it may concern:*

Be it known that I, TIMOTHY CLARK, of New Haven, in the county of New Haven and State of Connecticut, have invented certain new and useful Improvements in Machines for Cutting or Forming Irregular Forms on Wood or other Substances, and that the following is a full, clear, and exact description of the principle or character which distinguishes them from all other things before known and of the manner of making, constructing, and using the same, reference being had to the accompanying drawings, making part of this specification, in which—

Figure 1:
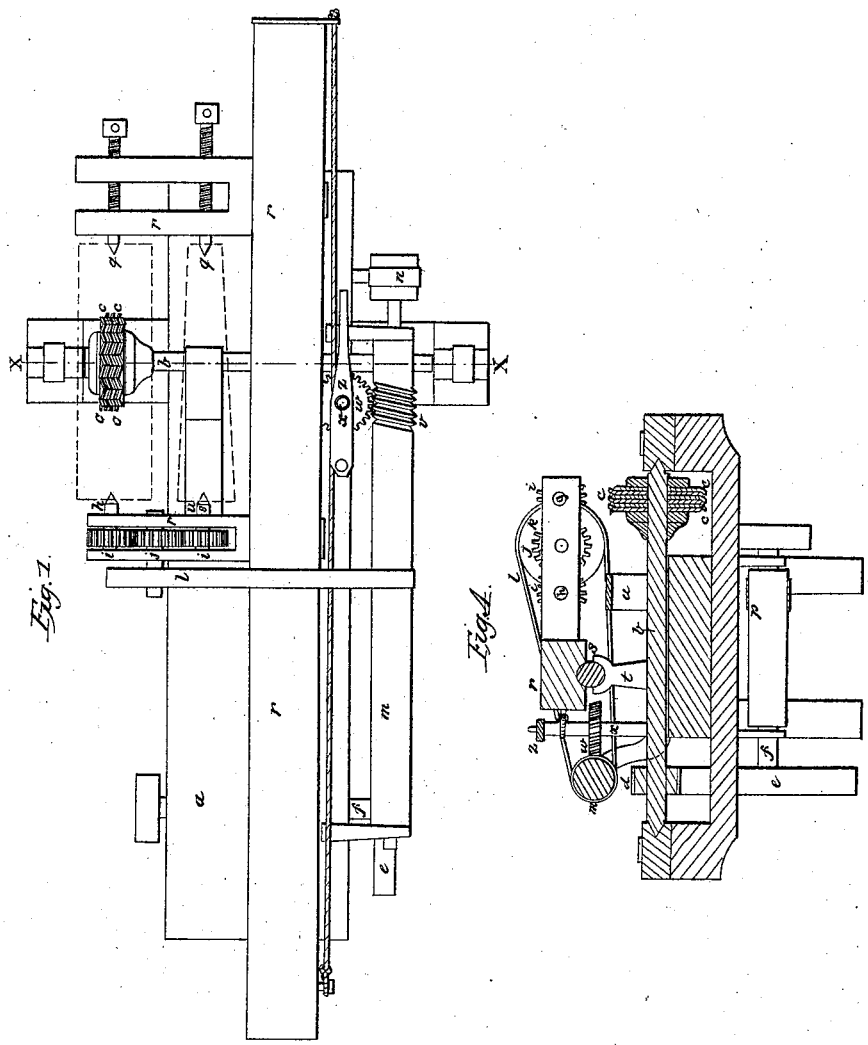
Figure 2:
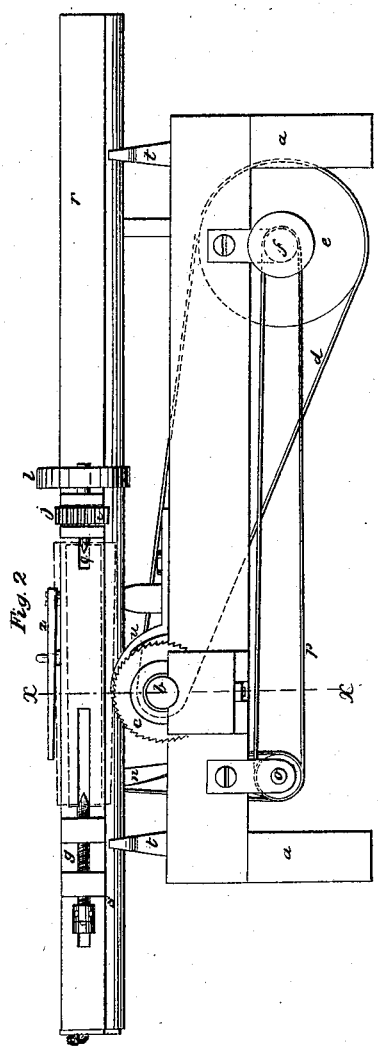
Figure 3:
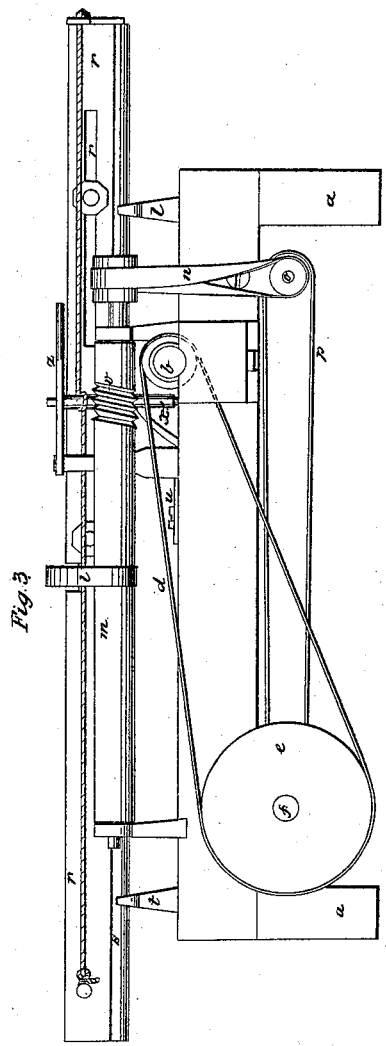

Figure 1 is a plan; Fig. 2, a longitudinal elevation, looking from the right side, and Fig. 3, a like elevation of the opposite side; and Fig. 4, a cross vertical section taken at the line (X X) of Fig. 1.

The same letters indicate like parts in all the figures.

Machines have been made for turning or cutting irregular forms on wood and other substances; but in these the cutters have been so arranged as to act on the substance to be shaped at right angles to its axis and therefore across the grain, which leaves an imperfect surface. And subsequently the cutter wheel has been so placed as to act on the substance to be shaped in the direction of its axis and therefore with the grain; but this was so applied as to form longitudinal irregularities only, as the pattern and substance to be shaped do not rotate during the operation of the cutter wheel.

The nature of my invention consists in placing the axis of rotation of the cutter wheel or wheels at right angles to the axis of rotation of the pattern and substance to be wrought into the desired form when this is combined with an arrangement of machinery by which the pattern and article to be shaped are made to rotate during the operation of the cutter wheel.

In the accompanying drawings (*a*) represents an appropriate foundation frame toward one end of which is hung in appropriate bearings the arbor (*b*) of a series of circular saws (*c, c, c, c*) which together constitute the cutter wheel for reducing the substance to be shaped. These circular saws are secured in the usual manner between collars, and the teeth are so set, (as shown in the drawings), as to extend entirely across the spaces between the saws—this shaft is driven by a band (*d*) from a wheel (*e*) on the main shaft (*f*).

The pattern of the form required is hung on a mandrel (*g*) and the wood or other substance to be formed on a corresponding mandrel (*h*), each of which is provided with a cog-wheel (*i*) by which they receive a slow rotary motion in the same direction by an intermediate cog wheel (*j*) on the axis of which there is a pulley (*k*) driven by a band (*l*) from a horizontal shaft (*m*) that receives motion from the main shaft (*f*) by a band (*n*), intermediate shaft (*o*) and band (*p*).

The two mandrels with their corresponding center points (*q, q*), (in manner similar to lathes) are hung in a carriage (*r*) which slides lengthwise to carry the wood over the saws from end to end and back, and vibrates laterally, to follow the irregularities of the pattern, on a rod (*s*) attached to its underside and sliding in eyes in the upper ends of the standards *t, t;* by this means the mandrels and nearly the whole weight of the carriage being on one side of the standards (*t, t*), the pattern is borne onto a curved rest (*u*) so that during the motion of the carriage from end to end the irregularities of the pattern passing over the rest the substance to be shaped is made to vibrate toward or from the axis of the cutter wheel, at the same time that it receives a slow rotary motion corresponding to that of the pattern.

The forward motion is given to the carriage by a worm (*v*) on the shaft (*m*) which takes into the teeth of the wheel (*w*) on the vertical arbor (*x*) around which passes a cord or chain (*y*) attached to each end of the carriage. The upper end of the arbor (*x*) has its bearing in a lever (*z*) so that at the end of the forward motion of the carriage the shifting of this lever will throw the teeth of the wheel out of the threads of the screw and permit the carriage to be drawn back for a second operation, and so on. Instead of this, any of the known modes of giving an alternative reciprocating motion from a continuous rotary one may be substituted.

The main beam of the carriage has a slot (*r'*) in it which receives this tenon of the head through which pass the center points ($q$, $q$) that the machine may be adapted to different lengths of patterns.

What I claim as my invention and desire to secure by Letters Patent is—

The arrangement of the cutter wheel or saws so as to cut in the direction of the grain of the wood or other substance to be formed, when this is combined with the rotation of the pattern and substance to be formed during the operation of the cutters, substantially as described.

TIMOTHY CLARK.

Witnesses:
CANIN BETTS,
GEO. E. DE FOREST.

[FIRST PRINTED 1913.]